May 27, 1941.  R. C. CLARK ET AL  2,243,248
BEET TOPPING MECHANISM
Filed Jan. 17, 1940  4 Sheets-Sheet 1

Inventors
*Robert C. Clark*
*Charles J. Clark*
By *Clarence A. O'Brien*
and *Hyman Berman*
Attorneys

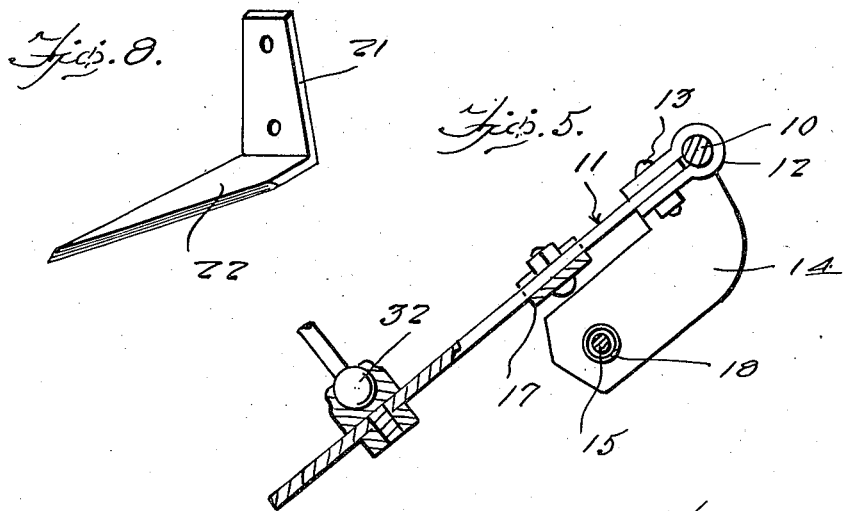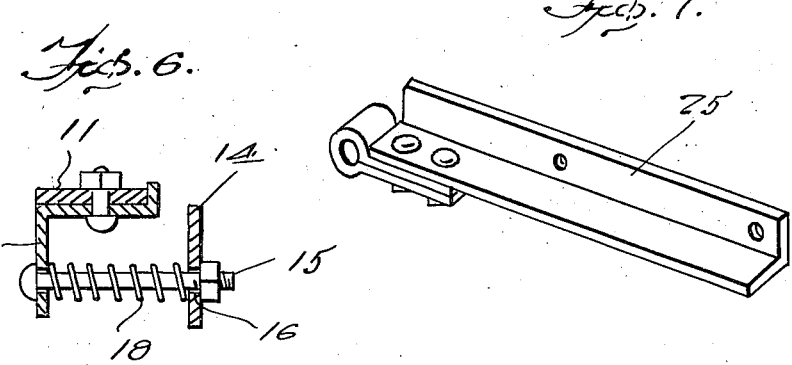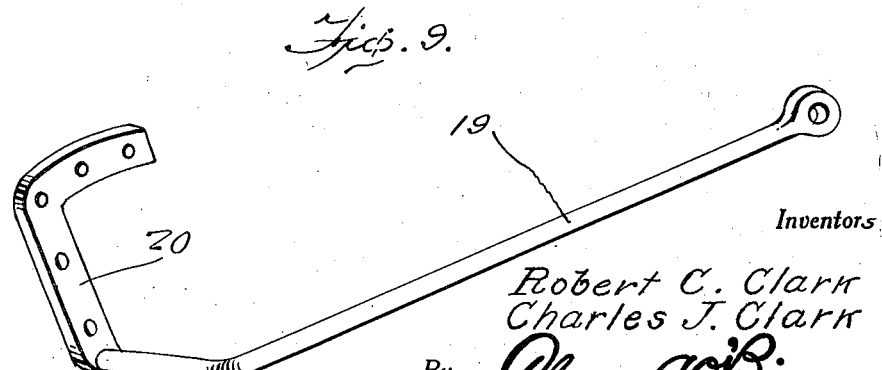

Patented May 27, 1941

2,243,248

UNITED STATES PATENT OFFICE 2,243,248

BEET TOPPING MECHANISM

Robert C. Clark and Charles J. Clark,
Townsend, Mont.

Application January 17, 1940, Serial No. 314,343

7 Claims. (Cl. 55—107)

This invention relates to a double row beet topping mechanism and has for the primary object the provision of a device of this character which may be readily adapted to a conveyance of the wheel type or to a beet digging machine, and which will deflect the leaves of the beets to one side of the rows and sever the tops from the beets at a governed distance from the upper end of the beets so that the latter will be capped of their leaves, leaving the leaves on the ground to the sides of the rows whereby the beets may be dug without interference from the leaves and be entirely free of the leaves when removed from the ground.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a side elevation illustrating a beet topping mechanism constructed in accordance with our invention and showing the same adapted to a conveyance.

Figure 5 is a detail sectional view illustrating one of the ground engaging arms, taken on line 5—5 of Figure 2.

Figure 6 is a detail sectional view taken on the line 6—6 of Figure 2.

Figure 7 is a perspective view illustrating one of the arms of the device.

Figure 8 is a perspective view illustrating one of the knives.

Figure 9 is a perspective view illustrating one of the knife supporting levers.

Figure 10 is a fragmentary perspective view illustrating one of the sweeps or blades for removing surplus dirt away from the beets.

Figure 1:
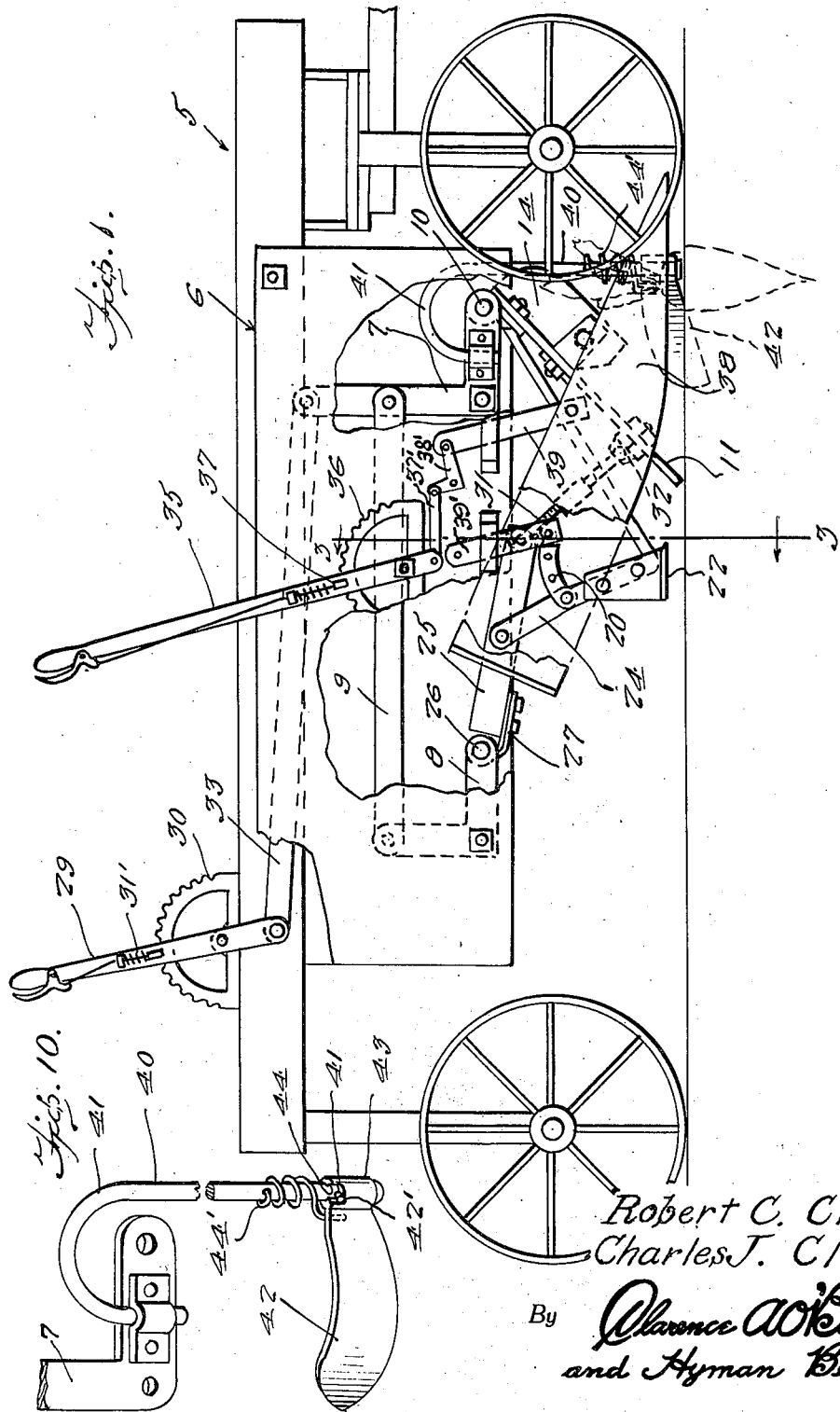
Figure 2:
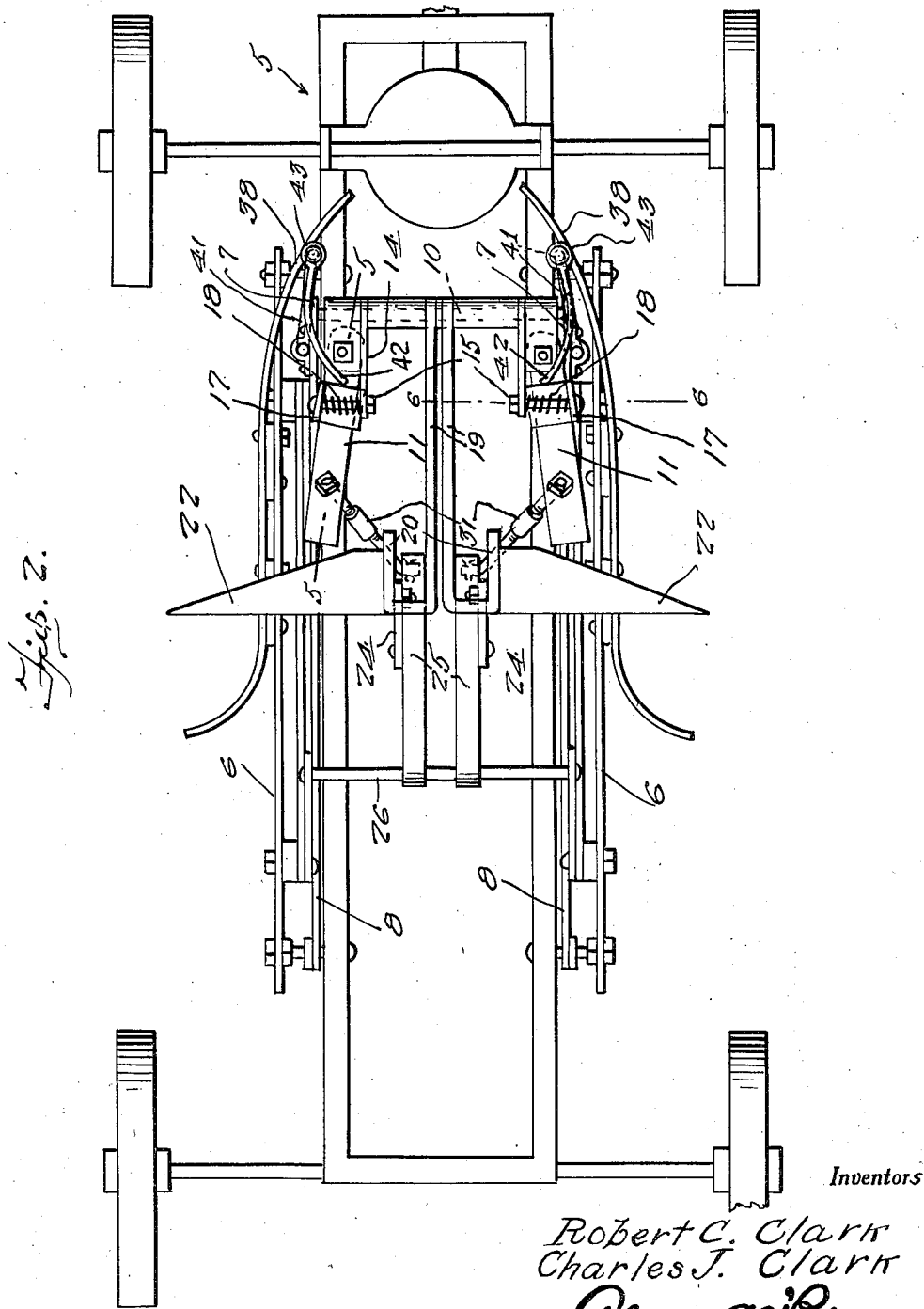
Figure 2 is a bottom plan view illustrating the mechanism and the conveyance.
Figure 3:
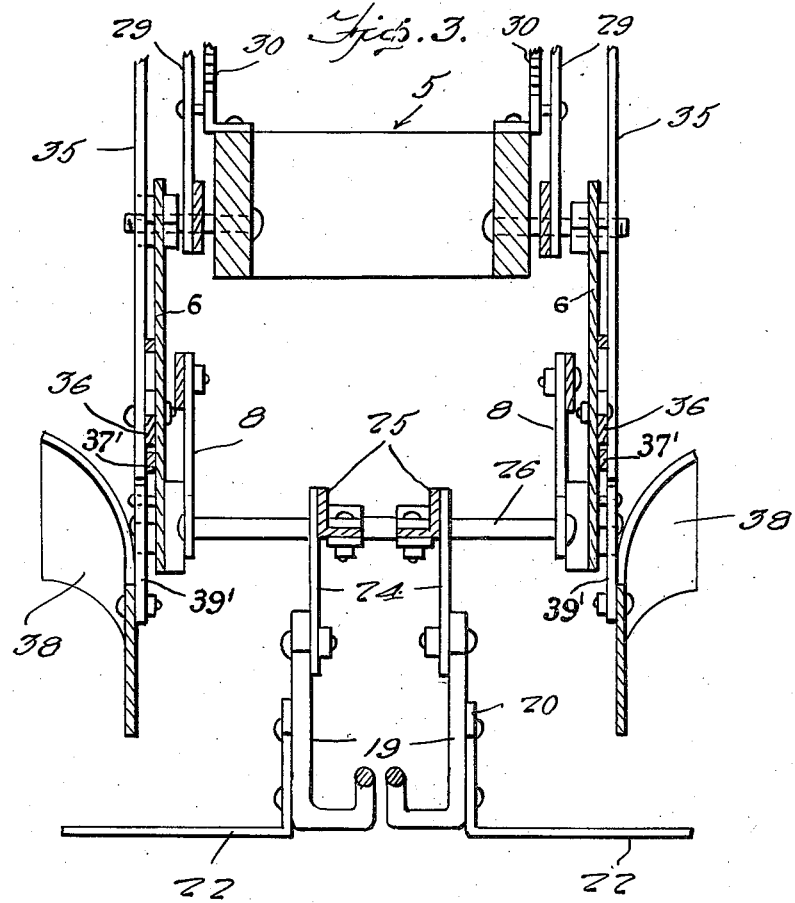
Figure 3 is a transverse sectional view taken on the line 3—3 of Figure 1.
Figure 4:
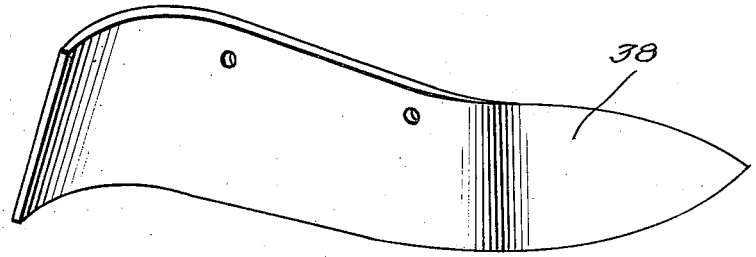
Figure 4 is a perspective view illustrating one of the deflectors.

Referring in detail to the drawings, the numeral 5 indicates a wheel type conveyance of any well known construction capable of traversing two rows of beets. This conveyance is merely illustrated to show a means of support for the present invention. However, it is to be understood that the present invention is readily adaptable to a beet digging machine.

Spaced supporting and mounting plates 6 are bolted or otherwise secured on the conveyance 5 and have pivoted thereto forward and rearward pairs of bell crank levers 7 and 8. The bell crank levers of each supporting plate 6 are coupled together by a connecting rod 9, the latter having pivotal connection with its respective bell crank levers.

The forward bell crank levers 7 are connected by a transverse shaft 10 on which are journaled ground-engaging elements 11. The connection of the elements 11 on the shaft is through the means of clamps 12 which are free to rotate on the shaft 10 and have the ground-engaging elements 11 pivoted thereto, as shown at 13, for swinging movement in a transverse direction with respect to the conveyance. The clamps 12 carry brackets 14 supporting bolts 15 which extend through openings 16 of ears 17 formed on the ground-engaging elements. Coil springs 18 are mounted on the bolts 16 and bear against the brackets 14 and the ears 17 for urging the ground engaging elements laterally in one direction and which will permit the ground-engaging elements to pivot in an opposite direction against the action of the springs should they engage an obstruction on the ground. The free ends of the ground-engaging elements under normal operation of the mechanism are adapted to ride the surface of the ground.

Also journaled on the shaft 10 are the forward ends of blade supporting levers 19 each of a construction or shape, as shown in Figure 9. This construction of the lever 19 provides at the free end thereof a substantially L-shaped blade attaching portion 20 having a series of openings to which an attaching shank 21 of a blade 22 may be adjustably secured thereon.

The blades 22 when adapted to the levers 19 extend in opposite directions and transversely of the conveyance and are arranged rearwardly of the ground engaging elements 11. The portions 20 of the levers 19 have pivoted thereto links 24 which are in turn pivotally connected to channel iron arms 25 journaled on a shaft 26 connecting the rear bell crank levers 8 by clamps 27.

A control lever 29 is pivotally mounted on a quadrant 30 carried by the conveyance and includes a detent 31' for coaction with the quadrant.

Links 31 adjustable as to length are pivotally connected to the forward ends of the arms 25 and have ball and socket connections 32 with the ground engaging elements 11.

A link 33 is pivotally connected to the control lever 29 and to one of the bell crank levers 7.

Through the operation of the control lever 29 it is possible to raise and lower the ground engaging elements as well as the knives or blades with respect to the ground.

Control levers 35 are pivotally mounted on quadrants 36 carried by the supporting plates 6 and include detents 37 coactive with the quadrants in releasably securing the control levers 35 in any of their adjusted positions. The control levers extend beyond the quadrants 36 and are pivotally connected to links 37' which are pivoted to bell crank levers 38' pivoted on the side plates. Links 39 are pivoted to the bell crank levers and to the deflectors 38. Links 39' are also pivoted to the deflectors and to the side plates. The deflectors are of elongated formation and taper toward their forward ends and have said forward ends curved to extend in advance to the ground engaging elements and act to engage under the leaves of beets growing in rows for the purpose of lifting the leaves to one side so that when the beets are engaged by the knives the leaves will not interfere with the cutting action of the knives consequently permitting the beets to be cut freeing the leaves from the beets and the deflectors act in deflecting the severed leaves to one side of the rows. The control levers 35 provide means whereby the deflectors may be raised and lowered with respect to the ground.

In operation, the ground engaging elements 11 riding upon the surface of the ground and due to their connection with the knives as heretofore described in detail will automatically govern the distance of the knives with respect to the surface of the ground and as the ground engaging elements ride into contact with a beet the trailing knives will be properly positioned for topping the beets at a proper distance below the upper end of the beets so that the leaves will be severed from the beets without unduly sacrificing any great portion of the beets. During the forward movement of the conveyance through any suitable draft means the ground engaging elements ride the ground in alignment with the rows of beets with the knives or blades 22 trailing said ground engaging elements. The deflectors operating in advance of the ground engaging elements lift the leaves of the beets and turn said leaves laterally of the rows and as the ground engaging elements ride in contact with the beets they automatically adjust the knives to top the beets as heretofore explained and as the leaves are severed the deflectors turn them laterally of the rows so that the beets topped and left in the ground are free of the leaves and ready to be dug by a digging mechanism which the present invention may be associated with.

Through the operation of the control levers 29 and 35 it is possible to render the device inoperative by raising the knives, ground engaging elements and deflectors a selected distance above the ground so that the conveyance may be moved from one place to another without the knives, ground engaging elements and deflectors being endangered by obstructions.

Depending supporting rods 40 including gooseneck shaped upper portions 41 are secured on the bell crank levers 7 and have mounted upon their lower ends for a limited swinging movement curved sweeps or blades 42 which are adapted to act on the soil in advance of the ground-engaging elements 11 to remove soil which may be banked up over the tops of the beets. The hubs or sweeps of the blades are indicated by the character 43 and are journaled on the supporting rods 40 and are provided with notches 44 to receive lugs or stop pins 42' on said rods 40 for limiting the swinging movement of the sweeps or blades. Coil springs 44' are mounted on the rods 40 and have one of their ends secured to said rods while the opposite ends bear against the blades or sweeps for urging them into a position so that the pins or stops engage one end wall of the notches. This positions the blades or sweeps so as to come in contact with the sides of the beets and as the blades or sweeps move relative to the beets they may swing on the rods to prevent damaging of the beets and which motion has a tendency to carry away from the beets surplus soil.

It is believed that the foregoing description, when taken in connection with the drawings will fully set forth the construction and advantages of this invention to those skilled in the art to which such a device relates, so that further detailed description will not be required.

Having thus described our invention, what we claim is:

1. In a device of the character described, a supporting structure mountable upon a conveyance, knives mounted on said supporting structure for upward and downward movement, ground engaging elements connected with said knives and pivotally mounted on the supporting structure for governing the distance of operation of said knives with respect to the ground and the upper ends of beets, and a manually operated control means connected to said knives and ground engaging elements for the elevation and lowering thereof with respect to the ground, deflectors mounted for pivotal movement on the supporting structure and operating in advance of the ground engaging elements and knives for raising and deflecting laterally leaves of the beets.

2. In a device of the character described, a supporting structure mountable upon a conveyance, knives mounted on said supporting structure for upward and downward movement, ground engaging elements connected with said knives and pivotally mounted on the supporting structure for governing the distance of operation of said knives with respect to the ground and the upper ends of beets, a manually operated control means connected to said knives and ground engaging elements for the elevation and lowering thereof with respect to the ground, deflectors mounted for pivotal movement on the supporting structure and operating in advance of the ground engaging elements and knives for raising and deflecting laterally leaves of the beets, and a manually actuated control means connected to said deflectors for regulating the operation of said deflectors with respect to the ground.

3. In a device of the character described, a mounting including spaced members, ground engaging elements pivotally supported on said members, arms pivoted on said members, knife supporting levers pivoted on said members, knives secured to said levers and extending in opposite directions and transversely of said members rearwardly of the ground engaging elements, a connecting means between said arms and said ground engaging elements, and a manually actuated control means connected to said arms and said ground engaging elements.

4. In a device of the character described, a mounting including spaced members, ground engaging elements pivotally supported on said members, arms pivoted on said members, knife supporting levers pivoted on said members, knives secured to said levers and extending in opposite directions and transversely of said members rearwardly of the ground engaging elements, a connecting means between said arms and said ground engaging elements, and a manually actuated control means connected to said arms and said ground engaging elements, deflectors pivotally mounted on said members and tapering toward the forward ends thereof and arranged forwardly of the ground engaging elements and the blades, and a manually actuated control means connected to said deflectors.

5. In a device of the character described, a mounting, forward and rearward pairs of bell crank levers pivoted on said mounting, ground engaging elements rotatably and pivotally connected to the forward pair of bell crank levers, arms pivoted on the rearward pair of bell crank levers, a connecting means joining said forward and rearward pairs of bell crank levers, blade levers journaled on the forward pair of bell crank levers, blades connected to said levers and arranged rearwardly of the ground engaging elements, links pivotally connecting the levers to said arms, adjustable connecting means joining the ground engaging elements to said arms, and control means for operating the bell crank levers.

6. In a device of the character described, a mounting, forward and rearward pairs of bell crank levers pivoted on said mounting, ground engaging elements rotatably and pivotally connected to the forward pair of bell crank levers, arms pivoted on the rearward pair of bell crank levers, a connecting means joining said bell crank levers, blade levers journaled on the forward pair of bell crank levers, blades connected to said levers and arranged rearwardly of the ground engaging elements, links pivotally connecting the levers to said arms, adjustable connecting means joining the ground engaging elements to said arms, control means connected to the bell crank levers, and spring means acting on the ground engaging elements to urge the latter in one direction and permit pivotal movement thereof when engaging an obstruction.

7. In a device of the character described, a mounting, forward and rearward pairs of bell crank levers pivoted on said mounting, ground engaging elements rotatably and pivotally connected to the forward pair of bell crank levers, arms pivoted on the rearward pair of bell crank levers, a connecting means joining said bell crank levers, blade levers journaled on the forward pair of bell crank levers, blades connected to said levers and arranged rearwardly of the ground engaging elements, links pivotally connecting the levers to said arms, adjustable connecting means joining the ground engaging elements to said arms, control means connected to bell crank levers, spring means acting on the ground engaging elements to urge the latter in one direction and permit pivotal movement thereof when engaging an obstruction, deflectors pivotally mounted on said mounting and extending forwardly of the blades and ground engaging elements, and a manually actuated control connected to said deflectors.

ROBERT C. CLARK.
CHARLES J. CLARK.